United States Patent
Bowen et al.

(10) Patent No.: US 10,227,078 B2
(45) Date of Patent: Mar. 12, 2019

(54) LUGGAGE CART ASSEMBLY

(71) Applicant: Art Design Works LLC, Lexington, MA (US)

(72) Inventors: Allen Bowen, Beverly, MA (US); Sheryl Handler, Cambridge, MA (US)

(73) Assignee: Art Design Works LLC, Lexington, MA (US)

( * ) Notice: Subject to any disclaimer, the term of this patent is extended or adjusted under 35 U.S.C. 154(b) by 0 days.

(21) Appl. No.: 15/659,024

(22) Filed: Jul. 25, 2017

(65) Prior Publication Data
US 2018/0022370 A1 Jan. 25, 2018

Related U.S. Application Data

(63) Continuation-in-part of application No. 29/592,511, filed on Jan. 31, 2017, now Pat. No. Des. 815,434, which is a continuation of application No. 29/538,000, filed on Aug. 31, 2015, now Pat. No. Des. 781,583.

(60) Provisional application No. 62/463,766, filed on Feb. 27, 2017.

(51) Int. Cl.
*B62B 1/14* (2006.01)
*B62B 1/26* (2006.01)

(52) U.S. Cl.
CPC .................. *B62B 1/14* (2013.01); *B62B 1/26* (2013.01); *B62B 2202/24* (2013.01); *B62B 2203/40* (2013.01)

(58) Field of Classification Search
CPC .. B62B 1/12; B62B 1/14; B62B 1/142; B25H 3/023; B25H 3/025
See application file for complete search history.

(56) References Cited

U.S. PATENT DOCUMENTS

| | | | |
|---|---|---|---|
| 687,619 A | 11/1901 | Couse | |
| 3,168,329 A * | 2/1965 | Goldschmidt | B62B 3/10 108/28 |
| D209,279 S | 11/1967 | Cohen | |
| 3,479,047 A | 11/1969 | Bailey | |
| 4,179,132 A | 12/1979 | Rich | |
| D268,620 S | 4/1983 | Schreiner | |

(Continued)

OTHER PUBLICATIONS

Google image search, Milk Crate Insulated Bag. Results for images related to the first image in the red square. Accessed Mar. 2, 2016.

(Continued)

*Primary Examiner* — Erez Gurari
(74) *Attorney, Agent, or Firm* — Wolf, Greenfield & Sacks, P.C.

(57) ABSTRACT

A luggage cart assembly including multiple luggage containers which are vertically arranged, and one or more of the containers are pivotable such that the container can be accessed without having to move the other containers, where the container includes first and second attachment members to attach the container to the luggage cart. When the first attachment member is detached from the luggage cart and the second attachment member remains attached to the luggage cart, the container is pivotable relative to luggage cart and the container is supported by the second attachment member. The first and second containers may be vertically separated from one another in some embodiments.

22 Claims, 9 Drawing Sheets

(56) References Cited

U.S. PATENT DOCUMENTS

| | | | | |
|---|---|---|---|---|
| 4,984,704 A | | 1/1991 | O'Malley | |
| 5,240,264 A | * | 8/1993 | Williams | B62B 3/006 |
| | | | | 211/194 |
| D352,585 S | | 11/1994 | Binning | |
| 5,427,394 A | * | 6/1995 | Lauto | B62B 3/02 |
| | | | | 280/33.998 |
| 5,464,104 A | * | 11/1995 | McArthur | A47F 5/0025 |
| | | | | 211/133.3 |
| D396,923 S | * | 8/1998 | Moore | 280/47.26 |
| 6,019,381 A | * | 2/2000 | Krawczyk | B62B 1/002 |
| | | | | 211/126.1 |
| 6,135,466 A | * | 10/2000 | Irwin | B62B 1/12 |
| | | | | 280/47.19 |
| D453,623 S | | 2/2002 | Meissner | |
| 6,394,471 B1 | * | 5/2002 | Watson | B62B 1/12 |
| | | | | 280/47.19 |
| 6,454,293 B1 | * | 9/2002 | Anderson | A61G 12/001 |
| | | | | 280/47.26 |
| 6,715,723 B2 | | 4/2004 | Zhu | |
| 6,722,671 B2 | * | 4/2004 | Be | A63B 47/007 |
| | | | | 206/315.9 |
| 7,036,641 B2 | | 5/2006 | Russo et al. | |
| 7,066,475 B2 | | 6/2006 | Barnes | |
| D530,915 S | | 10/2006 | Sijmons | |
| 7,367,571 B1 | * | 5/2008 | Nichols | B25H 1/12 |
| | | | | 280/47.131 |
| D578,270 S | | 10/2008 | Mulka et al. | |
| D578,724 S | | 10/2008 | Mulka et al. | |
| D584,471 S | | 1/2009 | Diedericks | |
| D602,253 S | | 10/2009 | Rees et al. | |
| D608,095 S | | 1/2010 | Turvey et al. | |
| D612,123 S | | 3/2010 | Lawrence | |
| 7,686,260 B1 | * | 3/2010 | Tetradis | B62B 1/142 |
| | | | | 248/100 |
| 7,703,776 B1 | * | 4/2010 | Nugent | B62B 1/22 |
| | | | | 280/47.18 |
| D639,051 S | | 6/2011 | Dare | |
| D639,557 S | | 6/2011 | Damda | |
| D650,584 S | | 12/2011 | Kim | |
| 8,104,778 B1 | * | 1/2012 | Rojas | B62B 1/14 |
| | | | | 248/98 |
| D653,832 S | * | 2/2012 | Vilkomirski | D34/25 |
| D656,315 S | | 3/2012 | Kwon | |
| D663,119 S | | 7/2012 | Wright | |
| D671,316 S | | 11/2012 | Kritzler | |
| 8,528,918 B2 | * | 9/2013 | Macias | B62B 3/02 |
| | | | | 280/47.35 |
| 8,567,796 B2 | | 10/2013 | Bar-Erez et al. | |
| D702,044 S | | 4/2014 | Shitrit et al. | |
| 8,789,836 B2 | | 7/2014 | Umbro et al. | |
| D719,730 S | | 12/2014 | Marabotto | |
| D731,181 S | | 6/2015 | Majeau | |
| 9,132,543 B2 | * | 9/2015 | Bar-Erez | B25H 3/023 |
| D757,387 S | * | 5/2016 | Cao | D34/21 |
| 9,527,205 B1 | * | 12/2016 | Lin | B25H 1/12 |
| 9,566,990 B2 | * | 2/2017 | Bar-Erez | B25H 3/023 |
| D781,583 S | | 3/2017 | Bowen et al. | |
| D782,145 S | | 3/2017 | Bowen et al. | |
| 9,643,629 B2 | * | 5/2017 | Bar-Erez | A47B 81/00 |
| 2003/0038008 A1 | | 2/2003 | Han | |
| 2004/0061298 A1 | * | 4/2004 | Sandoval | B62B 1/142 |
| | | | | 280/47.27 |
| 2004/0256817 A1 | * | 12/2004 | Sandoval | B62B 1/142 |
| | | | | 280/47.26 |
| 2005/0103950 A1 | | 5/2005 | Joubert | |
| 2007/0052188 A1 | * | 3/2007 | Steadman | B62B 1/14 |
| | | | | 280/47.131 |
| 2008/0135365 A1 | | 6/2008 | Han | |
| 2008/0197587 A1 | | 8/2008 | Nowak | |
| 2011/0049824 A1 | * | 3/2011 | Bar-Erez | B25H 3/023 |
| | | | | 280/47.18 |
| 2012/0326406 A1 | * | 12/2012 | Lifshitz | B25H 3/02 |
| | | | | 280/47.19 |
| 2014/0265190 A1 | * | 9/2014 | Beaver | B62B 3/10 |
| | | | | 280/47.19 |
| 2014/0375181 A1 | * | 12/2014 | Bar-Erez | B25H 3/023 |
| | | | | 312/111 |
| 2017/0217464 A1 | * | 8/2017 | Bar-Erez | B62B 1/14 |
| 2017/0341216 A1 | * | 11/2017 | Lin | B25H 3/025 |
| 2018/0015939 A1 | * | 1/2018 | Dorman | B62B 1/142 |

OTHER PUBLICATIONS

Upcart, :Up Cart: Pro Shopper, Accessed Jun. 16, 2017. https://upcart.com/upcart-pro-shopper.

* cited by examiner

LUGGAGE CART ASSEMBLY

CROSS-REFERENCE TO RELATED APPLICATIONS

This application claims priority under 35 U.S.C. § 119(e) to U.S. Provisional Application No. 62/463,766, entitled "LUGGAGE CART ASSEMBLY," filed on Feb. 27, 2017, which is herein incorporated by reference in its entirety. This application also claims priority under 35 U.S.C. § 120 and is a continuation-in-part of U.S. Design application No. 29/592,511, entitled "COMBINATION LUGGAGE CART AND LUGGAGE," filed Jan. 31, 2017, which is a continuation of U.S. Design application No. 29/538,000, entitled "COMBINATION LUGGAGE CART AND LUGGAGE," filed Aug. 31, 2015, now U.S. Design Pat. No. D781,583, issued Mar. 21, 2017, each of which is herein incorporated by reference in its entirety.

FIELD

Embodiments disclosed herein relate to methods and devices for transporting luggage.

BACKGROUND

As is known, carts and other trolleys are used to transport one or more pieces of luggage. Typically, such carts include a flat base onto which luggage is stacked.

SUMMARY

According to one embodiment, a luggage cart assembly includes a luggage cart, a first container attachable to the luggage cart via first and second attachment members, and a second container attachable to the luggage cart via third and fourth attachment members. When the first attachment member is detached from the luggage cart and the second attachment member remains attached to the luggage cart, the first container is pivotable relative to luggage cart, the first container being supported by the second attachment member when the first container is pivoted relative to the luggage cart.

According to another embodiment, a luggage cart assembly includes a luggage cart, a first container removably attachable to the luggage cart via first and second attachment members, and a second container removably attachable to the luggage cart via third and fourth attachment members, the second container being vertically separated from the first container. When the first attachment member is detached from the luggage cart and the second attachment member remains attached to the luggage cart, the first container is pivotable relative to the luggage cart.

According to still another embodiment, a method of using a luggage cart assembly is disclosed. The luggage cart assembly includes a luggage cart, a first container attached to the luggage cart via first and second attachment members, and a second container attached to the luggage cart via third and fourth attachment members. The method includes providing a luggage cart assembly, detaching the first attachment member from the luggage cart, and pivoting the first container relative to the luggage cart while the second attachment member remains attached to the luggage cart, the first container being supported by the second attachment member when the first container is pivoted relative to the luggage cart.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
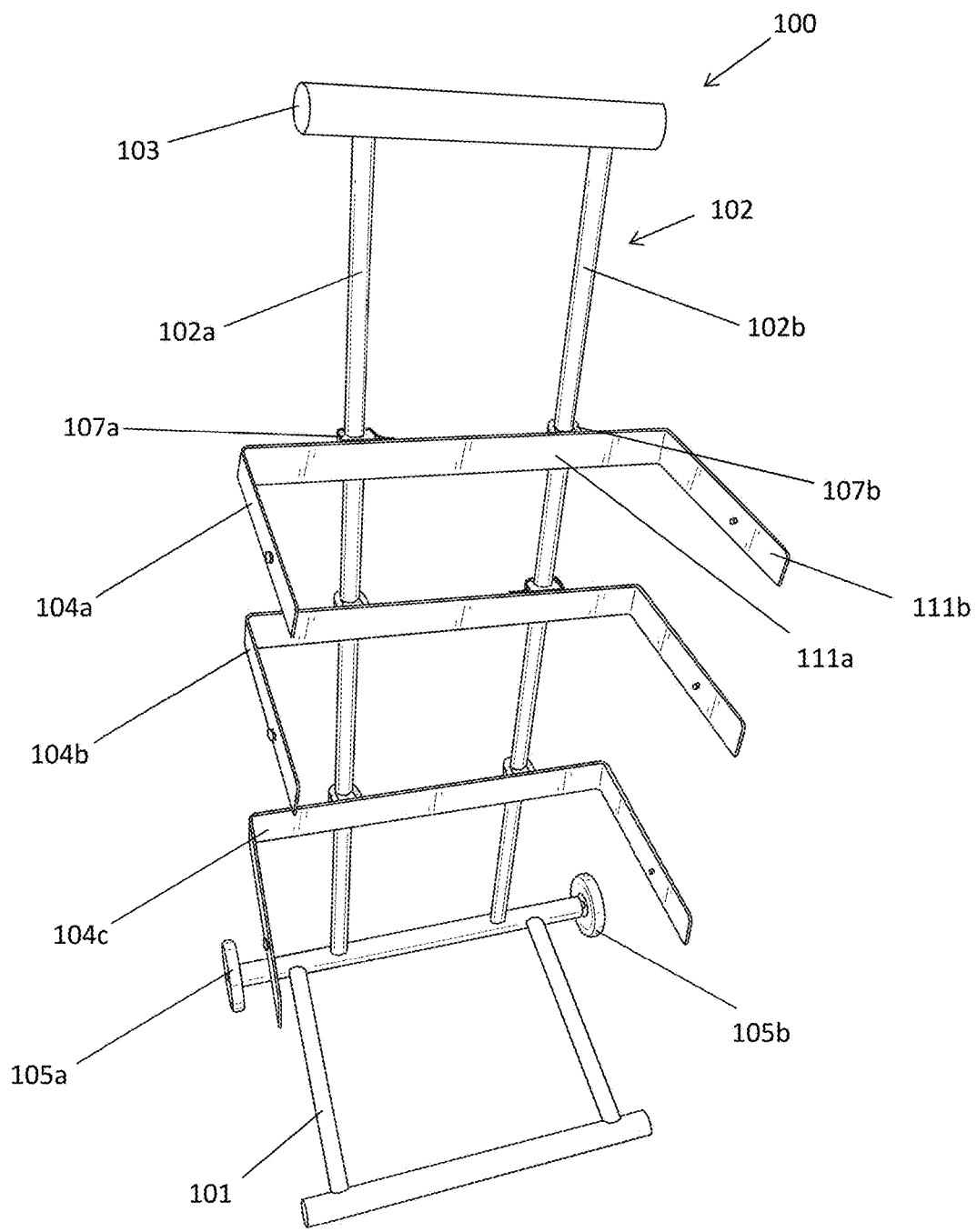
FIG. 1 is a perspective view of a luggage cart according to one embodiment.

Luggage carts traditionally include a flat base onto which multiple pieces of luggage are placed for transport. As is known, once the base is filled with one or more pieces of luggage, additional pieces of luggage must be piled on top of one another. In some instances the luggage is even tied down to the cart, such as with a rope or bungee cord, to ensure that the luggage does not fall off the cart during transport. Unfortunately, once the luggage pieces are stacked on top of one another and/or tied to the cart, accessing the contents of a piece of luggage can be difficult, especially for a piece of luggage not at the top of the stack. For example, a user will have to dismantle the luggage pile to locate the desired piece(s) of luggage, retrieve the needed contents from the selected piece of luggage, and restack the pile. This can be inconvenient and time consuming. As such, if a user were to have only a limited time to obtain contents from a piece of luggage, such as prior to boarding a flight, this inefficient process may prevent the user from being able to obtain his or her things in time.

Applicant has recognized that advantages may be realized by allowing a user to access individual pieces of luggage without having to first dismantle a stack of luggage. To that end, embodiments disclosed herein include a luggage cart assembly having a luggage cart, one or more pieces of luggage, also referred to herein as containers, and first and second attachment members for attaching each container to the luggage cart. In such embodiments, when the first attachment member is detached from the luggage cart and the second attachment member remains attached to the luggage cart, the container is pivotable relative to the luggage cart. For purposes herein, being pivotable relative to the luggage cart may mean that container swings, rotates or otherwise moves relative to the luggage cart. For example, in some embodiments, the container may move outwardly relative to the luggage cart.

As will be appreciated, such an arrangement may allow access to each container without removing any containers from the cart. For example, a user could detach one of the attachment members, grasp or push on one side of the container, and pivot the container outwardly relative to the cart. In such a position, at least a portion of the upper surface of the container may be accessible to the user such that its contents can be easily accessed. In some embodiments, when the container is pivoted into the outward position, the entire top of the container may be accessible to the user.

In some embodiments, the containers may be pivotable in the same direction. For example, first and second containers may be pivoted in a first direction. In such an arrangement, a third container also attached to the cart may then be accessible to the user. In other embodiments, the containers may be pivoted in different directions. For example, a user may pivot a first container in a first direction and a second container in a second, opposite direction. In such an arrangement (see, e.g., FIG. 6), both the first and second containers may be accessible by the user. As will be appreciated, containers also may be pivoted in other suitable directions, as desired by the user.

In some embodiments, the cart includes a base and a frame. In some embodiments, the frame may include one or more vertically-extending bars. In some embodiments, each container is attached to the frame, e.g., to the one or more bars, via attachment members. As will be appreciated, the attachment members are arranged to attach each container to the cart while allowing the container to be pivoted with respect to the cart at a desired time. In some embodiments, each container has two or more attachment members that attach the container to the cart. In such embodiments, one of the attachment members may be detached from the cart, while the other attachment member remains attached to the cart, such that the container may pivot relative to the cart.

In some embodiments, the containers may be attached directly to the frame via the first and second attachment members. In other embodiments, the containers may be attached to the frame via one or more sub-frames. In such embodiments, each sub-frame may be attached to the luggage cart via the attachment members. In some embodiments, the sub-frames may be fixedly attached to the frame—in some cases permanently. For example, a first attachment member may be fixedly attached to the frame while the second attachment member is removably attached thereto. As will be appreciated, in such an embodiment, the sub-frame may still rotate relative to the luggage cart. For example when the second attachment member is detached from the luggage cart, the sub frame may pivot relative to the cart via the first attachment member.

In embodiments in which the containers are attached to the cart via sub-frame, the containers may be removably attachable to the sub-frame. For example, the container may include one or more fasteners that engage with corresponding fasteners on the sub-frame. As another example, the container may include a pocket into which the sub-frame may be received to hold the container on the sub-frame. In other embodiments, the container may be permanently attached to the sub-frame. For example, the sub-frame may be integrally formed with the container.

In some embodiments, multiple containers may be attached to the luggage cart such that the containers are vertically arranged on top of one another. As will be appreciated, the containers need not contact one another to be vertically arranged. For example, the containers may be aligned in a column but each container may be vertically separated from one or more adjacent containers. For example, a first luggage container may be spaced vertically from an adjacent luggage container. As will be appreciated, the containers also may contact, or at least partially contact one another while being vertically arranged with one another. As will be further appreciated, the containers need not be aligned vertically, such as arranged in a vertical column, with adjacent container to be considered vertically arranged. For example, a first container may be vertically arranged with a second container as long as they at least partially overlap one another.

In some embodiments, each container may be individually removable from the cart. For example, from a stack of three pieces of luggage, a user could detach and remove the middle piece of luggage, or could pivot the middle piece of luggage outwardly relative to the luggage cart, without having to detach or otherwise move the other two pieces of luggage. As will be appreciated, such an assembly may allow the middle piece of luggage to be accessed while leaving the other two pieces of luggage attached to the cart.

In some embodiments, the containers may be attached to the cart at different vertical heights. For example, a user could attach a first container at a first height, a second container at a second height, and a third container at a third height. If desired, the user may detach and reattach the containers at different heights such that the containers may effectively be moved up or down relative to the other containers.

In some embodiments, the containers may be arranged on the cart based on weight. For example, a particularly heavy container may be rested on the base of the cart so that the cart to does not tip over while lighter containers are attached at a positioner higher up on the cart. As will be appreciated, in such an arrangement, the container may still be secured to the cart via attachment members.

Figure 2:
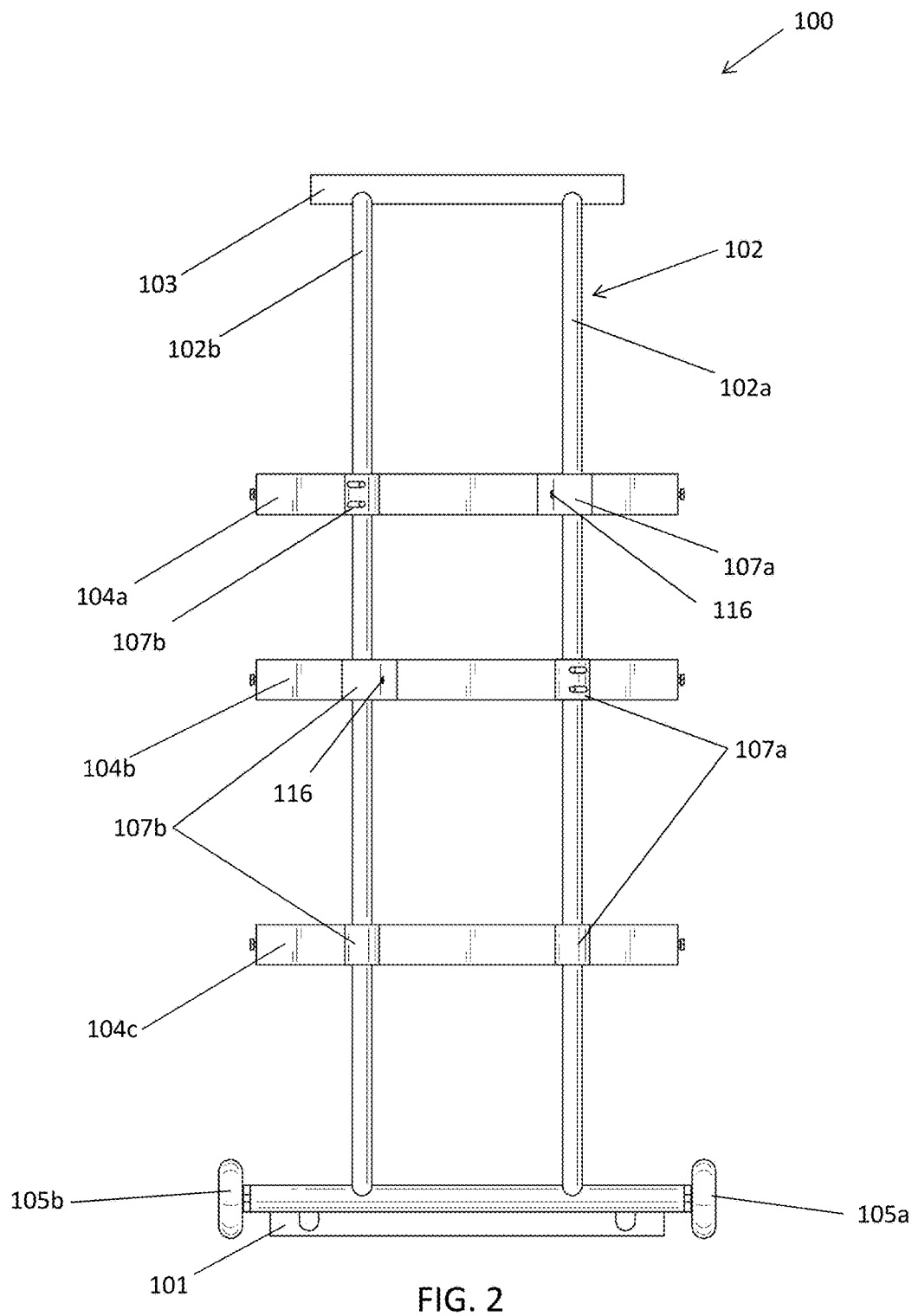
FIG. 2 is a rear view of the luggage cart of FIG. 1.
Figure 3:
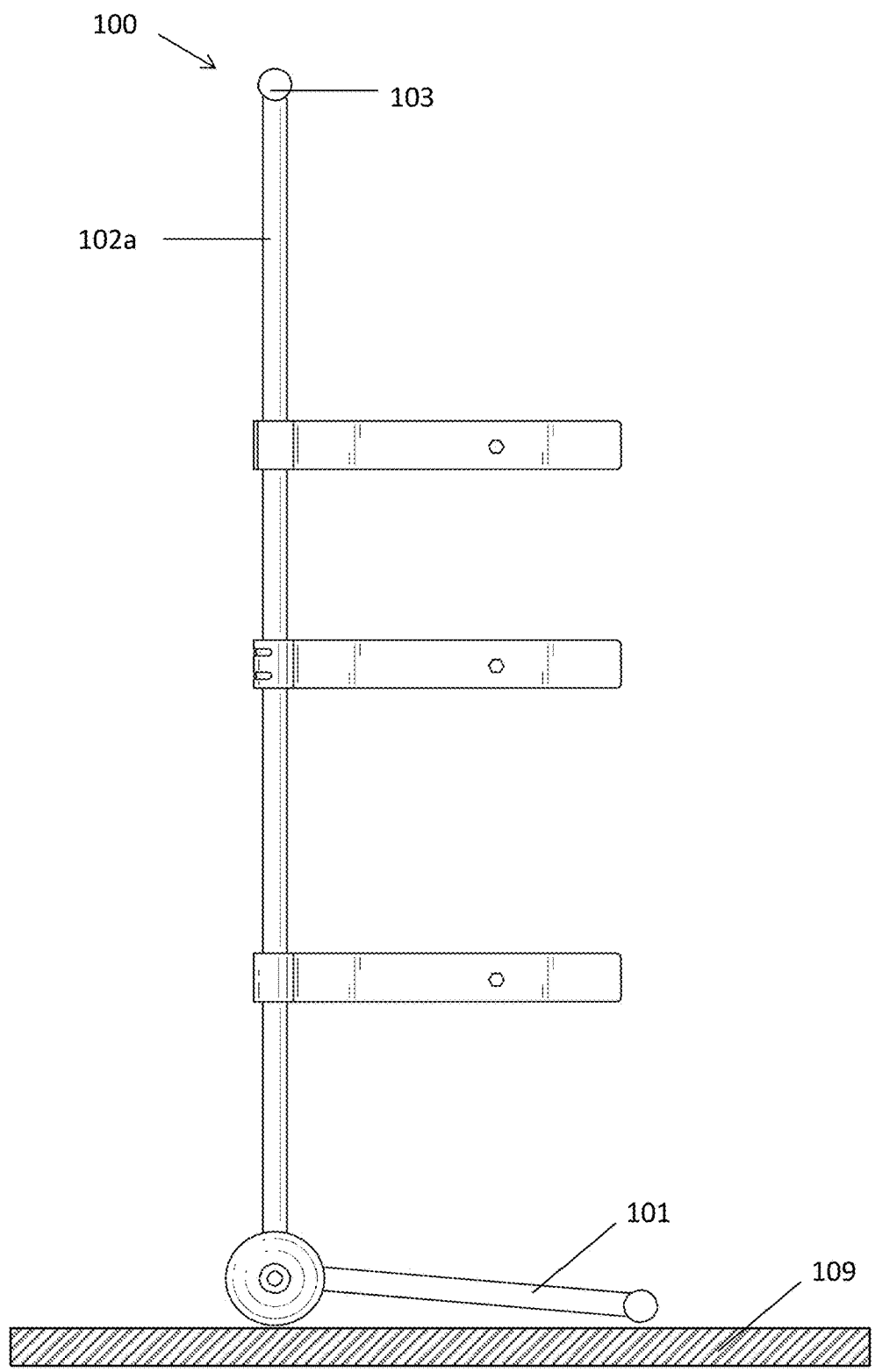
FIG. 3 is a side view of the luggage cart of FIG. 1.

Turning now to the figures, FIGS. 1-3 show a luggage cart 100 according to one embodiment of the present disclosure. As shown in these views, the cart 100 includes a base 101 with two or more wheels 105a, 105b, a frame 102 for supporting one or more pieces of luggage, and a handle 103 that is graspable by a user. In some embodiments, the frame may include two vertically extending bars 102a, 102b that are attached at respective ends to the base 101 and handle 103. As will be appreciated, in other embodiments, the frame may include only one bar or may include more than two bars. In such embodiments, the frame may be permanently attached to the base or may be removably attached thereto.

In some embodiments, as shown in FIG. 3, the frame 102 extends substantially perpendicular to a surface 109 on which the cart 100 is stably resting. For purposes herein, resting stably on the surface means that the cart is in an upright position and not being moved by a user. The cart rests stably even when the user is pivoting one or more pieces of luggage relative to the cart for access. As also shown in FIG. 3, in some embodiments, the frame 102 need not extend perpendicular to the base 101. For example, as shown in FIG. 3, the base 101 may be oriented at an angle relative the surface 109 and the frame. As will be appreciated, in other embodiments, the base 101 also may extend substantially parallel to the surface 109 and substantially perpendicular to the frame 102.

Figure 4:
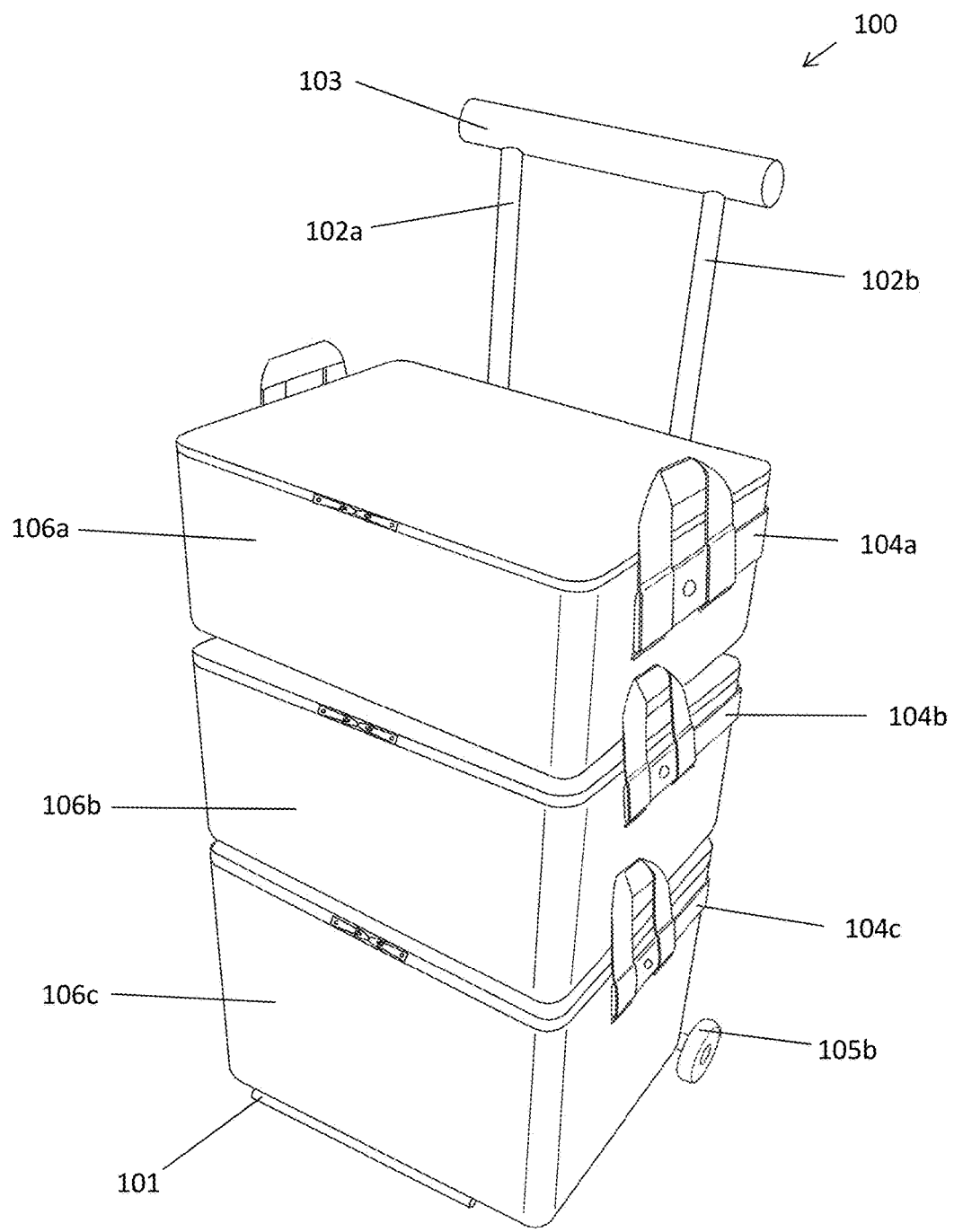
FIG. 4 is a perspective view of a luggage cart assembly with three pieces of luggage attached to a luggage cart according to one embodiment.

Returning to FIG. 1, in some embodiments, the cart 100 includes sub-frames 104a, 104b, 104c that are mounted to the frame 102 for supporting respective pieces of luggage (see for example FIG. 4). As will be appreciated, although three sub-frames are shown attached to the frame in this figure, in other embodiments, the cart may include only one or two sub-frames, or may include three or more sub-frames. As will be further appreciated, although the three sub-frames are shown as being the same shape and size in the embodiment of FIG. 1, in other embodiments, the sub-frames may vary in shape and size. For example, a first sub-frame may be smaller that at least one other sub-frame. In such embodiments, the respective containers also may have different shapes and sizes that correspond to the shapes and sizes of the sub-frames.

In some embodiments, as shown in FIGS. 2 and 3, the sub-frames extend substantially perpendicular to the frame. The sub-frame also may extend substantially parallel to the surface 109 on which the cart is stably resting. The sub-frames also may have other arrangements in other embodiments. For example, while a rear panel 111a of each sub-frame may extend substantially perpendicular to the frame 102 (and parallel to the surface 109), one or more side panels 111b may extend at an angle relative to the frame and/or surface.

As shown in FIGS. 1 and 2, each sub-frame includes first and second attachment members 107a, 107b for attaching the sub-frames to the respective first and second bars 102a, 102b of the frame 102. In some embodiments, both the first and second attachment members may be detachable from the cart. In other embodiments, only one of the first and second attachment members may be detachable from the cart. For example, as shown in these views, on the first sub-frame 104a, the first attachment member 107a is toollessly detachable from the first bar 102a while the second attachment member 107b is fixedly attached thereto. In a similar fashion, for the second sub-frame 104b, the first attachment member 107a is fixedly attached to the first bar 102a while the second attachment member 107b is toollessly detachable from the second bar 102b. In still other embodiments, neither the first or second attachment member is detachable from the bars. For example, both the first and second attachment members 107a, 107b of the third sub-frame are fixedly attached to the bars 102a, 102b of the frame 102. As will be appreciated, in such an embodiment, the third sub-frame 104c may not pivot relative to the cart.

For purposes herein, being fixedly attached to the sub-frame means that the attachment member is not removable from the respective bar without the use of a tool once the attachment member is attached to the respective bar. For example, the attachment member may be press-fit, screwed, glued, or otherwise affixed to the respective bar. In such embodiments, it may be possible for the attachment member to be detached from the respective bar via a tool at a later date. The fixed attachment member also may be permanently attached to the bar.

Figure 6:
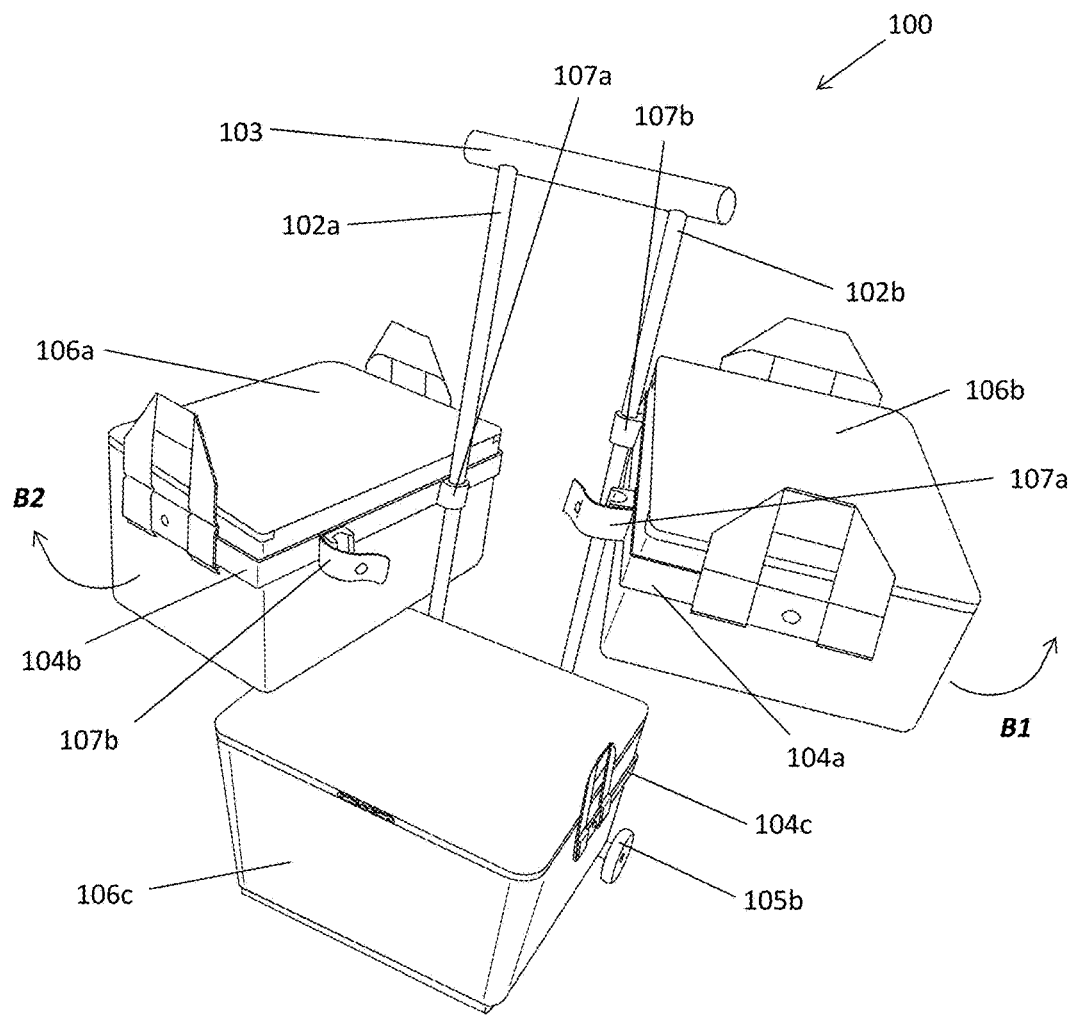
FIG. 6 is a perspective view of the luggage cart assembly of FIG. 4, with two of the pieces of luggage pivoted relative to the luggage cart.

As will be appreciated, and as shown in at least FIG. 6, being fixedly attached to the bar does not mean that the attachment member is not moveable relative to the bar. For example, as shown in FIG. 6, the first and second containers 106a, 106b pivot relative to the cart via attachment members 107b, 107a that are fixedly attached to the respective bar.

In some embodiments, the attachment members are fixedly attached to the sub-frames. The attachment members also may be permanently attached to the sub-frames. For example, the attachment members may be integrally formed with the sub-frames.

Figure 7A:
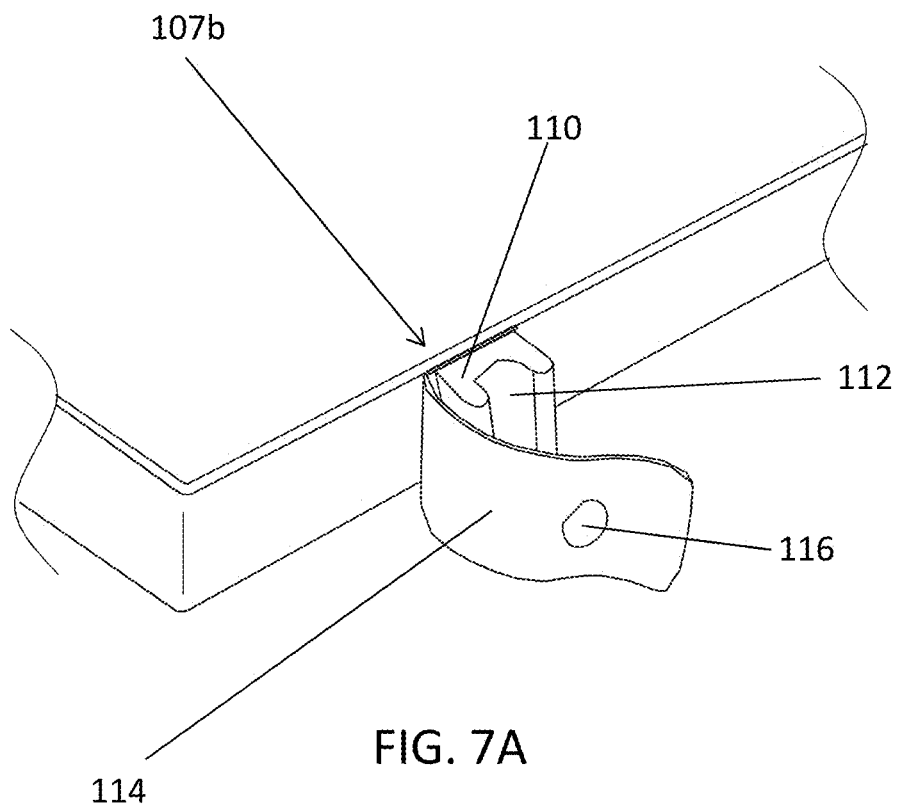
FIG. 7A is an enlarged perspective view of an attachment member according to one embodiment.
Figure 7B:
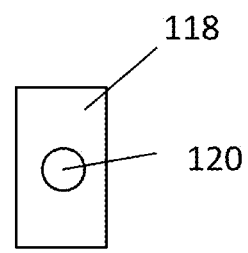
FIG. 7B is an enlarged side view of a side of a first member of the attachment member of FIG. 7A.

As will be appreciated, the attachment members may have any suitable arrangement for being removably attachable to the frame. In one example, as shown in FIGS. 7A and 7B, the attachment member 107b includes a first member 110 with a channel 112 into which a first side of the respective second bar 102b is received. The attachment member also includes a second member, strap 114, which is placed around the second side of the respective bar and attached to the first member via a fastener 116. As shown in FIG. 7B, the first member includes a respective fastener 120 that engages with the fastener 116 on the strap. As shown in FIG. 2, once the strap 114 is attached to the first member 110, the respective bar is held within channel 112 and in between the first member and the strap such that a container 106, full or empty, is supported by the attachment member in its pivoted and non-pivoted configurations. To remove the attachment member from the cart, the user need only pull on the strap to disengage the fastener on the strap with the corresponding fastener on the first member, and move the strap away from the bar.

Figure 7C:
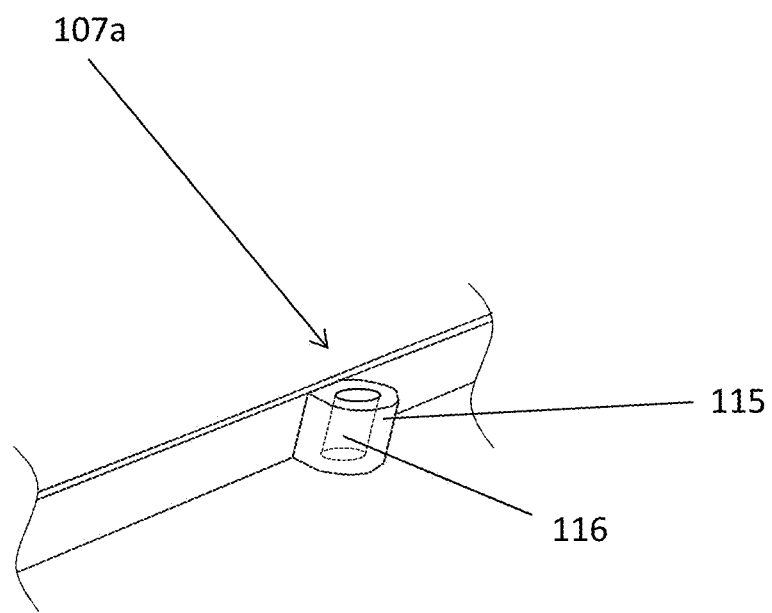
FIG. 7C is an enlarged perspective view of an attachment member according to another embodiment.

As shown in FIG. 7C, in embodiments in which the attachment member is fixedly attached to the luggage cart, (see, e.g., the first attachment member 107a attached to the second sub-frame 104b), the attachment member 107a also include a channel 113 in which a corresponding bar is held. As will be appreciated from this view, the channel extends between openings in the top and bottom of a first member 115. By using a channel, the ability of the attachment member to support the container and resist twisting may be improved.

The attachment member may have a length which provides support for holding a container when the container is pivoted such that the container is being supported by only one bar of the luggage cart. For example, the attachment members may be between about 1 inch long and about 5 inches long in some embodiments. Each attachment member may have the same length, however, the length of each attachment member also may vary from attachment member to attachment member. For example, an attachment member that is used to pivot the container about the cart and that supports the container in the pivoted position (e.g., the second attachment member 107b attached to the first sub-frame) may be longer than an attachment member that is detachable from the cart (e.g., the first attachment member 107a attached to the first sub-frame). In some embodiments, the attachment member is at least 1 inch long. In other embodiments, the attachment member is at least 3 inches long. In other embodiments, the attachment member is at least 5 inches long.

Although one attachment member is shown as attaching the container to each bar of the frame (e.g., first and second attachment members), in other embodiments, more than one attachment member may be used to attach the container to each bar of the frame. With attachment members spaced apart on the same bar, when the container is pivoted, less force may be applied to the upper attachment member as compared to an arrangement having only one attachment member. Two attachment members may be used to attach the second sub-frame to each of the first and second bars (e.g., four total attachment members attaching the second container to the frame). As will be appreciated, the same number of attachment members may be used to attach a container to each of the first and second bars of the frame (e.g., via the sub-frame), however, the number of attachment members may vary from bar to bar. For example, two attachment members may be used to fixedly attach the second container to the first bar while only one attachment member is used to removably attach the second container to the second bar.

Figure 8:
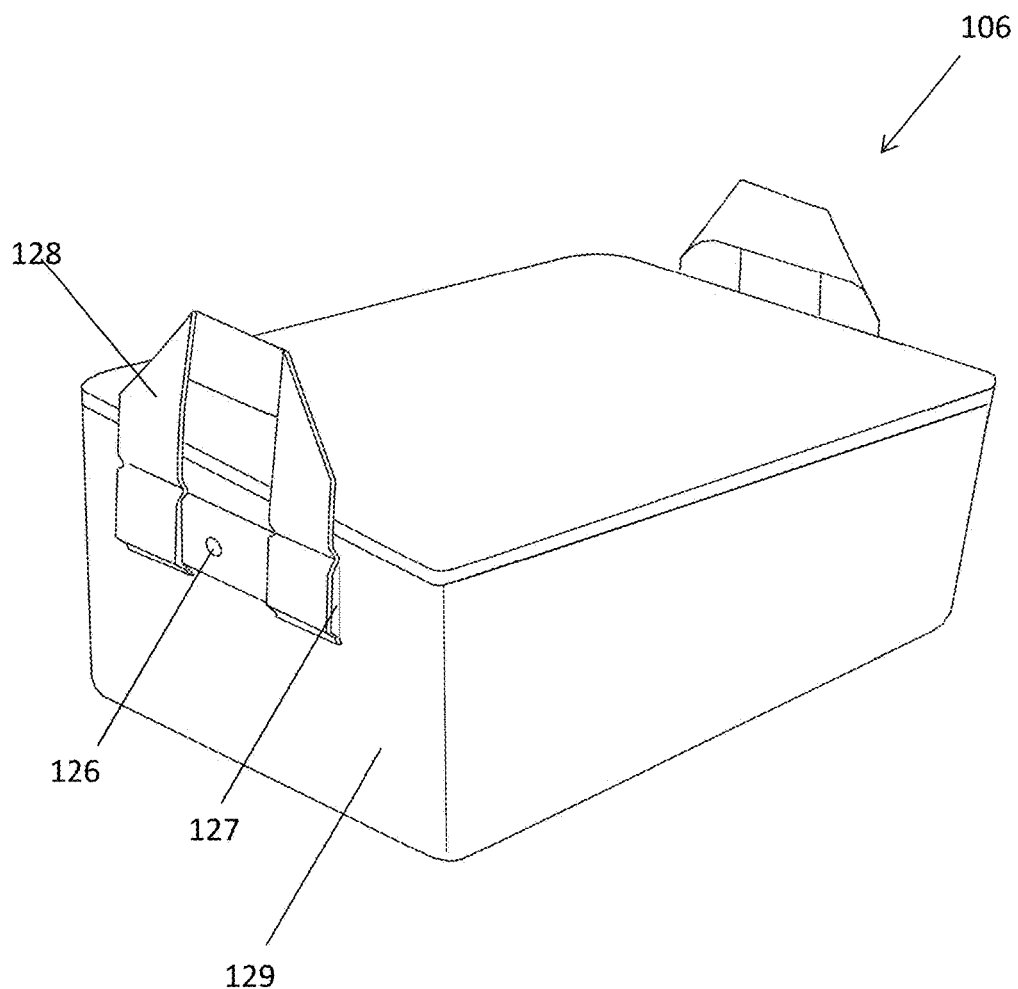
FIG. 8 is a perspective view of a luggage container according to one embodiment.

Turning now to FIG. 3, in some embodiments, the container is removably attachable to a respective sub-frame. In the illustrated embodiment, each sub-frame includes one or more fasteners 122 for attaching the respective container, shown here on the outer face 124 of the side panel 111b of the sub-frame. As shown in FIG. 8, the respective container may have a corresponding fastener 126 that engages with the fastener 122 on the sub-frame 104. In some embodiments, the fasteners may have a snap-fit engagement, although other suitable fasteners may be used (e.g., lock and key arrangement). As will be appreciated, the fasteners may be located on any suitable position on the sub-frame and container.

In some embodiments, as shown in FIG. 8, the container 106 may include one or more pockets 127 into which the sub-frames are inserted for aligning the container on the sub-frame and for holding the container relative to the sub-frame. In such embodiments, the pockets may be located on opposite sides 129 of the container. As shown in this figure, the corresponding fastener 126 may be located on an inside wall of such the pocket for engaging with a respective fastener 122 on the sub-frame. A handle 128 may be attached to the pocket for grasping the container 104 by the user. The containers 106 are not limited to only having one fastener, and could have multiple on each side to ensure adequate support of a full box, or even have multiple on a single side to aid support of the container when pivoted.

Figure 5:
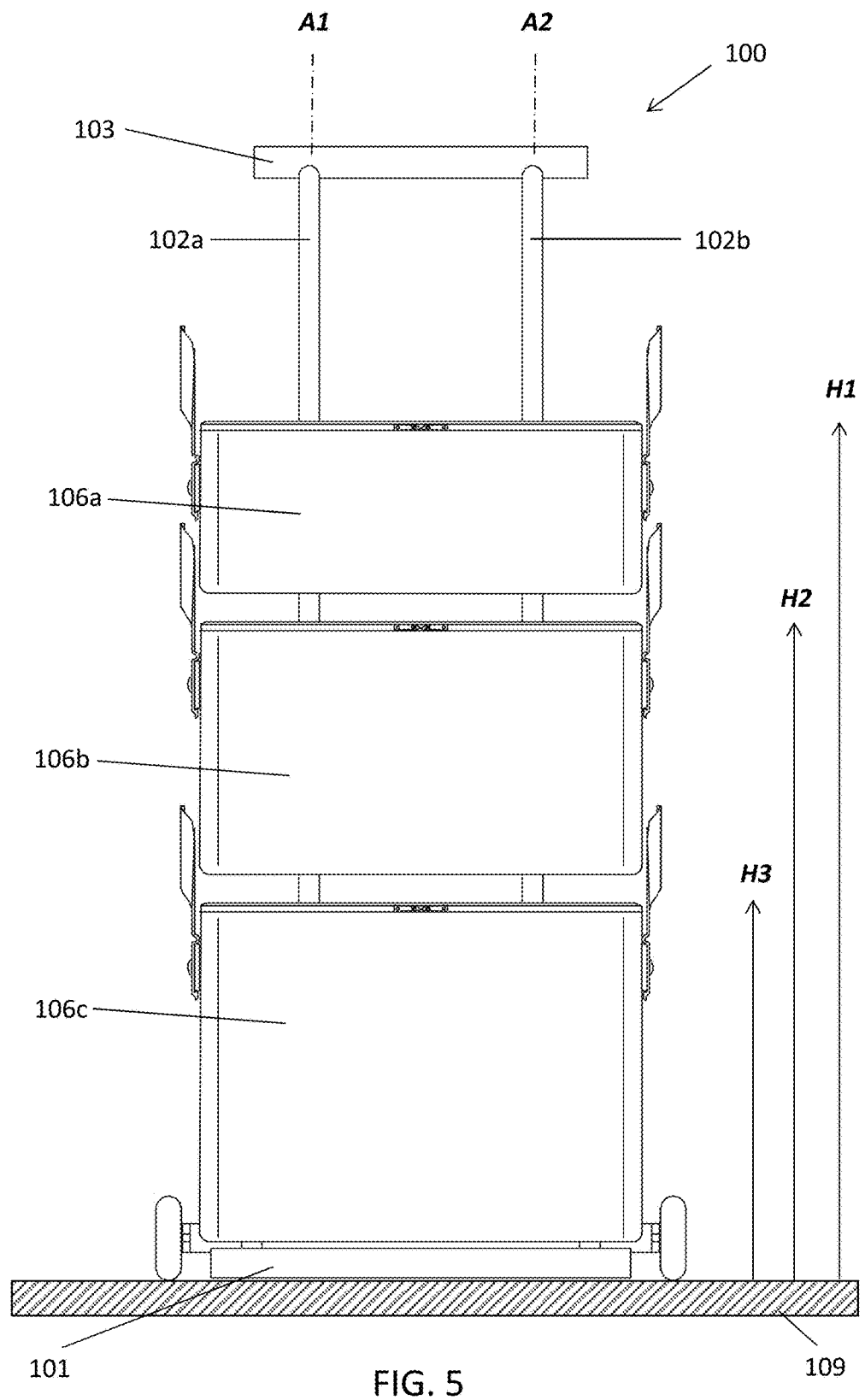
FIG. 5 is a front view of the luggage cart assembly of FIG. 4.

FIGS. 4-6 show three containers 106a, 106b, 106c attached to the cart in a vertically arranged position and in a pivoted position. As shown in FIG. 5, for example, when attached to the cart, the first, second, and third containers 106a, 106b, 106c may be positioned at first, second, and third vertical heights H1, H2, H3, from the surface 109 on which the cart 100 is stably resting. As shown in this figure, the containers are vertically aligned in a column, with the bottom of the first container spaced apart from the top of the second container, and the bottom of the second container spaced from the top of the third container. The containers also may be arranged to at least partially contact one another in other embodiments.

As will be appreciated, in such embodiments, each container is supported by the respective attachment members when the containers are in the vertically arranged position. In such an arrangement, being supported by the attachment members means that the attachment members maintain the containers at the respective heights when the cart is stably resting on the surface. As shown in FIG. 5, in the pivoted position, each container also remains supported by at least one attachment member. For example, the attachment member may maintain the container at substantially at the same height while moving relative to the cart. For purposes herein, remaining substantially at the same height means that the container does not move vertically when the container is pivoted with respect to the cart (e.g., the first container stays at vertical height H1 in the vertically arranged and pivoted positions). As will be appreciated, the container also may move slightly vertically, such as less than about 2 inches, when the container is pivoted. As illustrated in the figures, even with such slight vertical movement, the container does not fall to the surface or fall onto an adjacent container when it is pivoted relative to the cart. A user also need not support the container when the container is in the pivoted position.

Although the containers are shown as being the same length in these embodiments, the containers may have different lengths. Additionally, although the containers are shown are showing as having different heights (e.g., a distance between the top of the container and the bottom of the container), the containers may be the same height in other embodiments.

FIG. 6 shows the containers in a pivoted position. In some embodiments, as shown in this view, the first container 106a may be pivoted outwardly in a first direction (see arrow B1) and the second container 106b may be pivoted in a second direction (see arrow B2) that is opposite to the first direction. As will be appreciated, the first and second containers need not be pivoted in the same direction. For example, both the first and second containers may be pivoted in the same direction. As will be further appreciated, both containers need not be pivoted into an outward position at the same time. For example, only the first container may be pivoted outwardly in some embodiments, while in other embodiments, only the second container may be pivoted.

As shown in FIGS. 5 and 6, the first and second containers are pivotable relative to respective bars 102a, 102b of the frame. For example, for the first container 104a, the first attachment member 107a is detached from the first bar 102a, and the container is pivotable relative to the second bar 102b via the second attachment member 107b. The first container 104a moves about the second axis A2, which extends along a longitudinal axis of the second bar 102b. The second container 104b is pivotable relative to a first axis A1 that extends along a longitudinal axis of the first bar 102a via the first attachment member 107a when the second attachment member 107b is detached from the second bar 102b.

As will be appreciated, although the first container rotates relative to the second bar and the second container rotates relative to the first bar (when respective attachment members are detached), both containers may be arranged to pivot relative to the same bar in other embodiments.

In some embodiments, each container is rotatable about its respective axis between about 0 degrees and 180 degrees. In such embodiments, in the fully rotated positioned, a back of each container may be positioned against a rear-facing side of the frame (the rear-facing side opposite to the side of the frame shown in FIG. 5). As will be appreciated, each container need not be rotated about its respective axis by the same amount as the other containers. For example, the first container may be rotated 90 degrees with the container being substantially perpendicular to a front-facing side of the cart, while the second container may be rotated only 45 degrees relative to its respective axis.

Although the containers are shown as being removably attachable to the sub-frames in these embodiments, it will be appreciated that in other embodiments, the containers may be attached directly to the frame. For example, in some embodiments, the sub-frames may be integrally formed with the container. In another example, the cart assembly may have no sub-frame, with the attachment members attached to the containers.

In some embodiments, the luggage cart assembly includes a series of different containers. In such embodiments, each container may differ in shape, size, and/or color. In some embodiments, each container includes the same attachment members such that the user can select which container they want to attach to the cart frame or to each sub-frame. In other embodiments, sub-frames may come in a variety of accommodating shapes, or may have adjustable lengths in order to accommodate different containers. This modularity of containers provides flexibility in what can be transported.

In some embodiments, the cart may be completely disassembled for ease of storage. The wheels, bars, and sub-frames may be detached from one another and may be stored either in the containers or separately. In other embodiments, the cart may be foldable. For example, the bars may include a series of lockable hinge joints along their length, such that the joints can be unlocked and bars can be folded. In still other embodiments, the vertical bars may include telescoping poles that can extend and contract as desired by the user. Such an arrangement may allow the user to adjust the height of the luggage cart depending on the number of containers that need to be moved or depending on a cart height that is more comfortable for the user.

The cart, including the frame and sub-frame, may be formed of any suitable material or combination of materials. For example, the cart may be formed of a metal, such as aluminum. The cart also may be formed of plastic.

According to another aspect of the disclosure, a method of using a cart assembly having a cart and one or more luggage containers attached to the cart is disclosed. In some embodiments, the luggage container is attached to the cart via first and second attachment members. In some embodiments, the method includes detaching a first attachment member and pivoting the container relative to the cart while the second attachment member remains attached to the cart. In some embodiments, a second container is attached to the cart via third and fourth attachment members, and the method includes pivoting the second container relative to the cart via the fourth attachment member when the third attachment member is detached from the cart.

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing," or "involving," and variations thereof herein, are meant to encompass the items listed thereafter and equivalents thereof as well as additional item

What is claimed is:

1. A luggage cart assembly comprising:
   a luggage cart having a frame and a base;
   a sub-frame having a rear panel and first and second side members, wherein the sub-frame is attached to the luggage cart via first and second attachment members;
   a first container attachable to the sub-frame via the first and second side members, the first side member attachable to a first side of the first container and the second side member attachable to a second, opposite side of the first container; and
   a second container attachable to the luggage cart via third and fourth attachment members;
   wherein, when the first container is attached to the sub-frame, the first attachment member is detached from the luggage cart, and the second attachment member remains attached to the luggage cart, the first container and the sub-frame are adapted to pivot relative to luggage cart, the sub-frame being supported by the second attachment member when the first container is pivoted relative to the luggage cart.

2. The luggage cart assembly of claim 1, wherein, when the second attachment member is detached from the luggage cart and the first attachment member remains attached to the luggage cart, the first container and the sub-frame are adapted to pivot relative to the luggage cart, the sub-frame being supported by the first attachment member when the first container is pivoted relative to the luggage cart.

3. The cart assembly of claim 1, wherein the first container is attached to the frame via the sub-frame.

4. The cart assembly of claim 1, wherein the first container is removably attached to the sub-frame.

5. The cart assembly of claim 1, wherein the first and second attachment members are fixedly attached to the sub-frame.

6. The cart assembly of claim 1, wherein the sub-frame is substantially perpendicular to the frame.

7. The cart assembly of claim 1, wherein the first and second attachment members removably secure the first container at a first vertical height, wherein the first container remains substantially at the first vertical height when the first container is pivoted relative to the luggage cart.

8. The luggage cart of claim 1, wherein the frame includes one or more vertically extending bars.

9. The luggage cart of claim 1, wherein the first attachment member is detachable from the luggage cart without a tool.

10. The luggage cart assembly of claim 1, wherein the first container is pivotable outwardly relative to the cart.

11. A luggage cart assembly comprising:
    a luggage cart including a frame and a base;
    a first container attachable to the luggage cart via first and second attachment members; and
    a second container attachable to the luggage cart via third and fourth attachment members;
    wherein, when the first container is attached to the luggage cart, the first attachment member is detached from the luggage cart, and the second attachment member remains attached to the luggage cart, the first container is adapted to pivot relative to luggage cart, the first container being supported by the second attachment member when the first container is pivoted relative to the luggage cart;

wherein the first container is attached to the frame via a sub-frame, the first container being removably attached to the sub-frame;

wherein the first container includes first and second fasteners that engage with complementary first and second fasteners on the sub-frame.

12. A luggage cart assembly comprising;
a luggage cart;
a first container removably attachable to the luggage cart via first and second attachment members;
a second container removably attachable to the luggage cart via third and fourth attachment members, the second container being vertically separated from the first container; and
a third container removably attachable to the luggage cart, wherein the third container is not pivotable relative to the luggage cart;
wherein, when the first container is attached to the luggage cart, the first attachment member is detached from the luggage cart, and the second attachment member remains attached to the luggage cart, the first container is adapted to pivot relative to the luggage cart;
wherein, when the third attachment member is detached from the luggage cart and the fourth member remains attached to the luggage cart, the second container is pivotable relative to the luggage cart.

13. The luggage cart assembly of claim 12, wherein, when the first container is pivoted relative to the luggage cart, the second container does not pivot relative to the cart.

14. The luggage cart assembly of claim 12, wherein the first container is pivotable in a first direction and the second container is pivotable in a second direction.

15. The luggage cart assembly of claim 14, wherein the first direction is opposite to the second direction.

16. The luggage cart assembly of claim 12, wherein, when the first container is pivoted relative to the luggage cart, the first container is supported by the second attachment member.

17. The luggage cart assembly of claim 12, wherein, when the second container is pivoted relative to the luggage cart, the second container is supported by the fourth attachment member.

18. The luggage cart assembly of claim 12, wherein the first container is pivotable outwardly relative to the cart.

19. A method of using a luggage cart assembly, the luggage cart assembly having a luggage cart, a first container attached to the luggage cart via first and second attachment members, and a second container attached to the luggage cart via third and fourth attachment members, the method comprising:
providing a luggage cart assembly:
detaching the first attachment member from the luggage cart; and
pivoting the first container relative to the luggage cart while the second attachment member remains attached to the luggage cart, the first container being supported by the second attachment member when the first container is pivoted relative to the luggage cart.

20. The method of claim 19, further comprising:
detaching the third attachment member; and
pivoting the second container relative to the luggage container while the fourth attachment member remains attached to the luggage cart.

21. The method of claim 20, wherein pivoting the first container includes pivoting the first container in a first direction and pivoting the second container includes pivoting the second container in a second direction, the first direction being opposite to the second direction.

22. The method of claim 19, further comprising re-attaching the first attachment member to the luggage cart.

\* \* \* \* \*